US012231861B2

(12) United States Patent
Maeshiba et al.

(10) Patent No.: US 12,231,861 B2
(45) Date of Patent: Feb. 18, 2025

(54) SIGNAL PROCESSING DEVICE, SIGNAL PROCESSING METHOD, AND IMAGE DISPLAY DEVICE

(71) Applicant: SONY GROUP CORPORATION, Tokyo (JP)

(72) Inventors: Hiroaki Maeshiba, Tokyo (JP); Hiroshi Yoshioka, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 361 days.

(21) Appl. No.: 17/755,343

(22) PCT Filed: Oct. 30, 2020

(86) PCT No.: PCT/JP2020/040821

§ 371 (c)(1),
(2) Date: Apr. 27, 2022

(87) PCT Pub. No.: WO2021/090770

PCT Pub. Date: May 14, 2021

(65) Prior Publication Data

US 2022/0369032 A1 Nov. 17, 2022

(30) Foreign Application Priority Data

Nov. 6, 2019 (JP) ................................ 2019-201198

(51) Int. Cl.
*H04R 3/04* (2006.01)

(52) U.S. Cl.
CPC .......... *H04R 3/04* (2013.01); *H04R 2499/15* (2013.01)

(58) Field of Classification Search
CPC .. H04R 3/04; H04R 2499/15; H04R 2440/05; H04R 7/045; H04S 2420/05
See application file for complete search history.

(56) References Cited

U.S. PATENT DOCUMENTS

| | | | | |
|---|---|---|---|---|
| 6,509,885 B1 * | 1/2003 | Hanaki | .................... | G09G 3/14 345/82 |
| 2009/0103767 A1 * | 4/2009 | Kuroda | .................. | H04M 1/03 381/388 |
| 2013/0135330 A1 * | 5/2013 | Choi | .................... | G09G 3/3648 345/545 |

(Continued)

FOREIGN PATENT DOCUMENTS

| | | | | |
|---|---|---|---|---|
| JP | 2019-186830 A | 10/2019 | | |
| WO | WO-2018123310 A1 * | 7/2018 | ............ | H04R 1/025 |

OTHER PUBLICATIONS

International Search Report and Written Opinion of PCT Application No. PCT/JP2020/040821, issued on Jan. 12, 2021, 08 pages of ISRWO.

*Primary Examiner* — Oyesola C Ojo
(74) *Attorney, Agent, or Firm* — CHIP LAW GROUP

(57) ABSTRACT

Provided is a signal processing device including a control unit configured to control each of a plurality of actuators configured to drive a display unit on the basis of an acoustic signal, in which the plurality of the actuators is provided for respective regions of the display unit, and the control unit executes low band component reduction processing of reducing a low band component of an acoustic signal of the region for driving the actuator on the basis of luminance of an image to be displayed in the region of the display unit.

10 Claims, 13 Drawing Sheets

(56) References Cited

U.S. PATENT DOCUMENTS

| | | | | |
|---|---|---|---|---|
| 2015/0277565 | A1* | 10/2015 | Harris | G06F 3/04166 345/173 |
| 2017/0280246 | A1* | 9/2017 | Choi | H04R 1/288 |
| 2020/0196082 | A1* | 6/2020 | Heilemann | H04R 1/2811 |
| 2020/0234653 | A1* | 7/2020 | Lee | G09G 3/3291 |
| 2020/0349879 | A1* | 11/2020 | Park | G09G 3/3266 |
| 2021/0110771 | A1* | 1/2021 | Lee | G09G 3/3258 |
| 2021/0035505 | A1* | 2/2021 | Kwon | G09G 3/3258 |
| 2021/0074217 | A1* | 3/2021 | Lee | G09G 3/325 |
| 2021/0118368 | A1* | 4/2021 | In | G09G 3/3275 |

* cited by examiner

FIG. 8

| LUMINANCE | VOLUME | HPF OF LOW BAND |
|---|---|---|
| 100 OR MORE | ENTIRE BAND 100% | NO FILTER |
| 80 | LOW BAND (200Hz OR LESS) 80% | CUT OFF 50Hz OR LESS |
| 50 | LOW BAND (200Hz OR LESS) 50% | CUT OFF 100Hz OR LESS |
| ... | ... | ... |
| 20 | LOW BAND (200Hz OR LESS) 30% | CUT OFF 200Hz OR LESS |
| 10 OR LESS | LOW BAND (200Hz OR LESS) 20% | CUT OFF 300Hz OR LESS |

SIGNAL PROCESSING DEVICE, SIGNAL PROCESSING METHOD, AND IMAGE DISPLAY DEVICE

CROSS REFERENCE TO RELATED APPLICATIONS

This application is a U.S. National Phase of International Patent Application No PCT/JP2020/040821 filed on Oct. 30, 2020, which claims priority benefit of Japanese Patent Application No. JP 2019-201198 filed in the Japan Patent Office on Nov. 6, 2019. Each of the above-referenced applications is hereby incorporated herein by reference in its entirety.

TECHNICAL FIELD

The present disclosure relates to a signal processing device, a signal processing method, a program, and an image display device.

BACKGROUND ART

Patent Document 1 describes an image display device that generates sound by vibrating an image display panel.

CITATION LIST

Patent Document

Patent Document 1: International Publication No. 2018/123310

SUMMARY OF THE INVENTION

Problems to be Solved by the Invention

In a case where an image displayed on an image display panel is dark, or the like, an object (e.g., an object existing at a position facing the image display panel) in a viewing space or a posture of a viewer is reflected on the image display panel. When the image display panel vibrates, image shake in which an object or the like reflected on the image display panel shakes is visually recognized, and there is a problem that a viewer who views an image feels uncomfortable.

One object of the present disclosure is to provide a signal processing device, a signal processing method, a program, and an image display device capable of effectively suppressing occurrence of image shake.

Solutions to Problems

The present disclosure is, for example, a signal processing device including:

- a control unit configured to control each of a plurality of actuators configured to drive a display unit on the basis of an acoustic signal,
- in which the plurality of actuators is provided for respective regions of the display unit, and
- the control unit executes low band component reduction processing of reducing a low band component of the acoustic signal of the region for driving the actuator on the basis of luminance of an image to be displayed in the region of the display unit.

The present disclosure is, for example, a signal processing method including:

- controlling, by a control unit, each of a plurality of actuators configured to drive a display unit on the basis of an acoustic signal,
- in which the plurality of actuators is provided for respective regions of the display unit, and
- the control unit executes low band component reduction processing of reducing a low band component of an acoustic signal of the region for driving the actuator on the basis of luminance of an image to be displayed in the region of the display unit.

The present disclosure is, for example, is a program causing a computer to execute a signal processing method including:

- controlling, by a control unit, each of a plurality of actuators configured to drive a display unit on the basis of an acoustic signal,
- in which the plurality of actuators is provided for respective regions of the display unit, and
- the control unit executes low band component reduction processing of reducing a low band component of the acoustic signal of the region for driving the actuator on the basis of luminance of an image to be displayed in the region of the display unit.

The present disclosure is, for example, an image display device including:

- a display unit configured to display an image;
- a plurality of actuators configured to drive the display unit on the basis of an acoustic signal; and
- a control unit configured to control each of the plurality of actuators,
- in which the plurality of actuators is provided for respective regions of the display unit, and
- the control unit executes low band component reduction processing of reducing a low band component of an acoustic signal of the region for driving the actuator on the basis of luminance of an image to be displayed in the region of the display unit.

BRIEF DESCRIPTION OF DRAWINGS

FIG. 8 is a table for explaining luminance, volume, and low band HPF.

MODE FOR CARRYING OUT THE INVENTION

The embodiments and the like of the present disclosure will be described in the following order.

EMBODIMENT

Modification Example

The embodiments and the like described below are preferred specific examples of the present disclosure, and the contents of the present disclosure are not limited to these embodiments and the like.

EMBODIMENT

Figure 1:
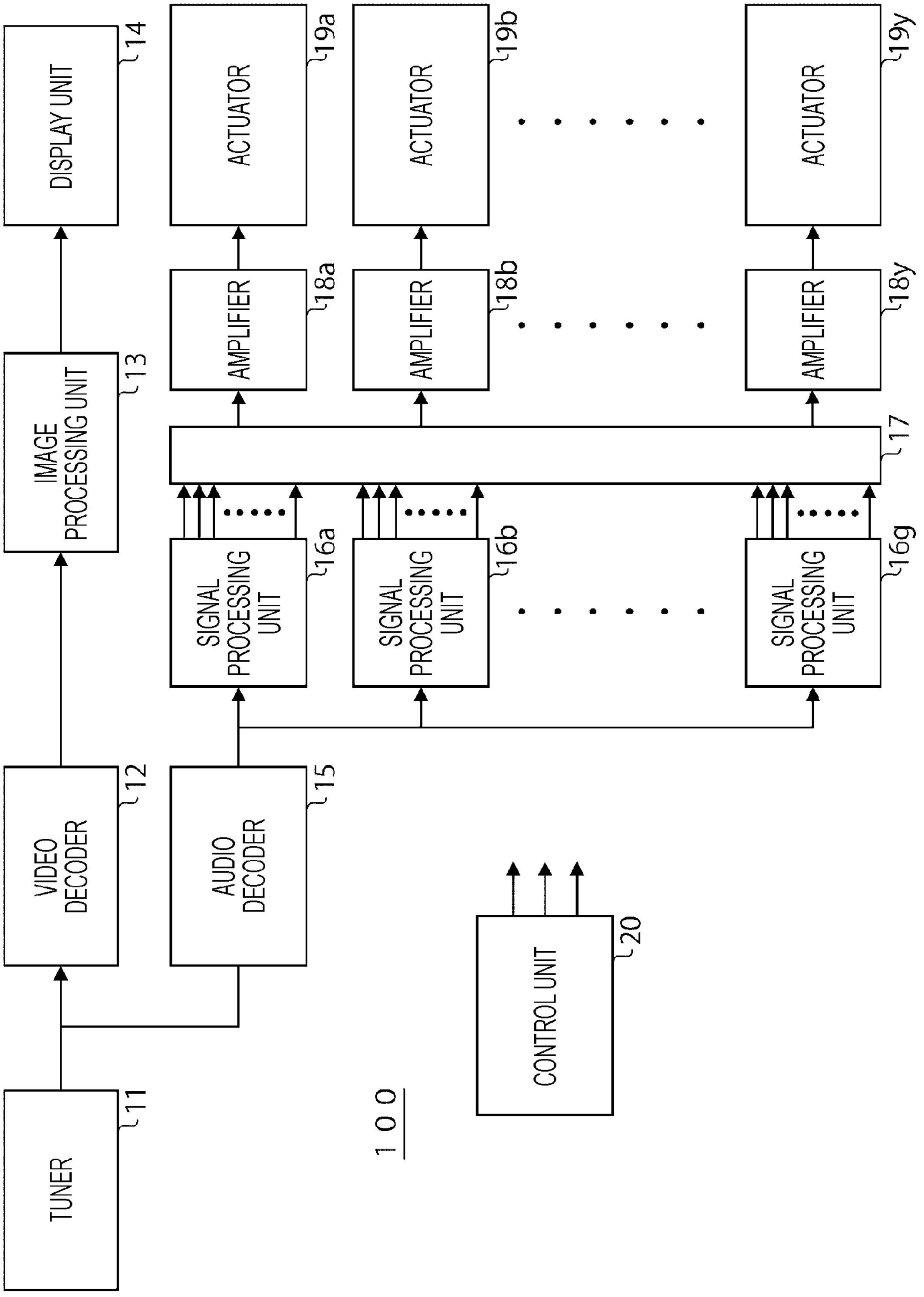
FIG. 1 is a block diagram illustrating the configuration of an image display device according to an embodiment.

FIG. 1 is a block diagram illustrating the configuration of an image display device (image display device 100) according to a present embodiment. The image display device 100 of the present embodiment receives an input signal from a tuner 11, displays an image on a display unit 14, and emits an acoustic signal by using a plurality of actuators 19*a* to 19*y* that vibrate the display unit 14. The plurality of actuators 19*a* to 19*y* is attached to a back surface opposite to a display surface on which an image is actually displayed. A control unit 20 integrally controls the image display device 100. As one of the controls, the control unit 20 controls each of the plurality of actuators 19*a* to 19*y* that drives the display unit 14 on the basis of the acoustic signal.

The image display device 100 of the present embodiment includes a video decoder 12, an image processing unit 13, and the display unit 14 as an image system. Moreover, included as an acoustic system are an audio decoder 15, signal processing units 16*a* to 16*g*, the actuators 19*a* to 19*y*, a matrix control unit 17 (also referred to as a cross mixer), and amplifiers 18*a* to 18*y* that drive the actuators 19*a* to 19*y*, respectively.

The video decoder 12 decodes a video signal input from a source such as the tuner 11, converts the video signal into an image signal, and outputs the image signal to the image processing unit 13. The image processing unit 13 performs analysis processing or machining processing on the input image signal, and then displays the image signal on the display unit 14. In the image processing unit 13 of the present embodiment, luminance distribution of the input image signal may be analyzed for each preset region.

The audio decoder 15 decodes an audio signal input from a source such as the tuner 11 and converts the audio signal into an acoustic signal for each channel (e.g., seven channels). Acoustic signals of channels in charge are input into the respective signal processing units 16*a* to 16*g*, and the input acoustic signals are processed to generate acoustic signals for the respective actuators 19*a* to 19*y*. Thereafter, the acoustic signal for each of the actuators 19*a* to 19*y* is mixed by the matrix control unit 17 and output to each of the amplifiers 18*a* to 18*y*.

Figure 2:
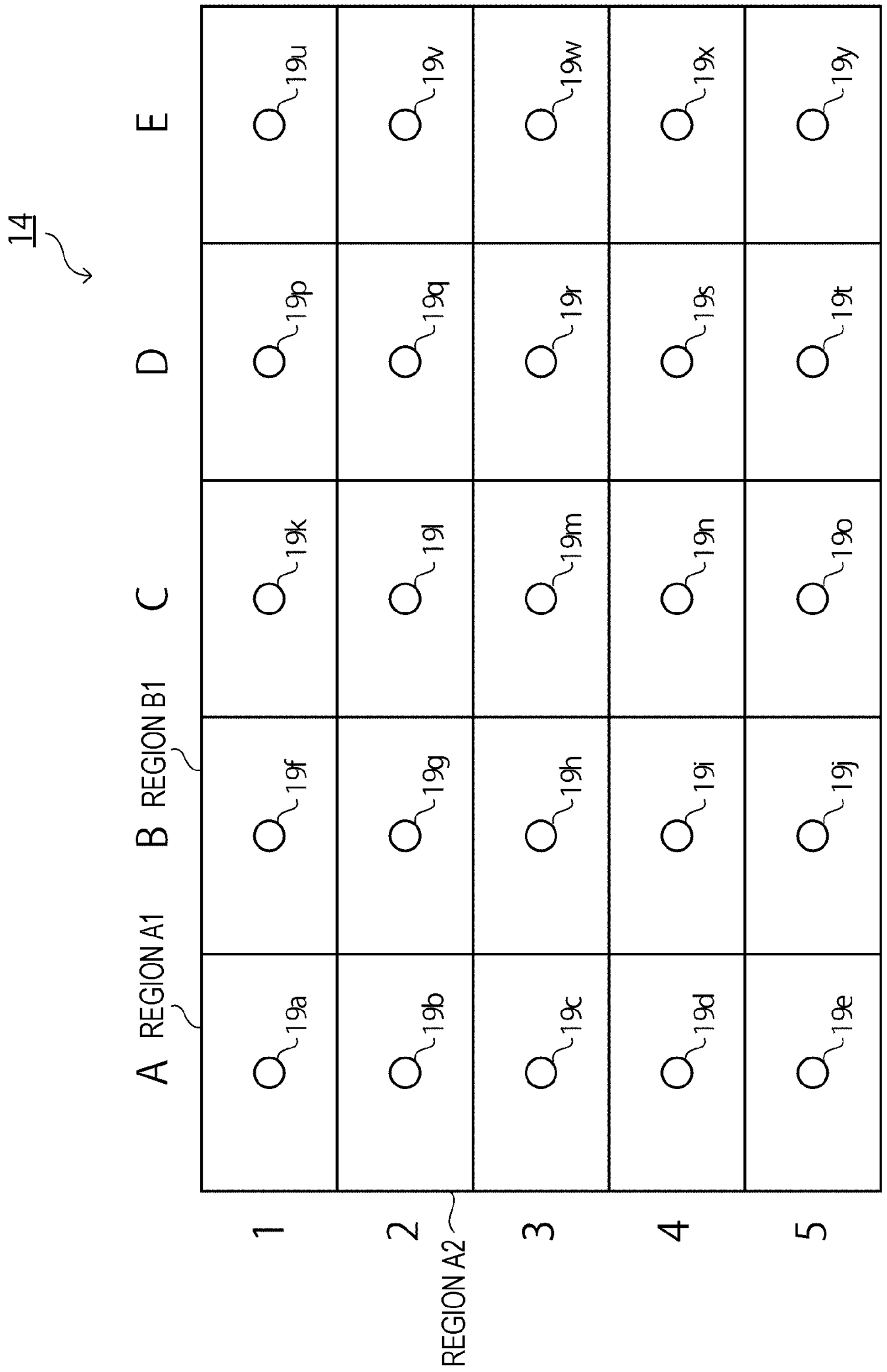
FIG. 2 is a block diagram illustrating the configuration of the image display device according to an embodiment.

FIG. 2 is a diagram schematically illustrating the display unit 14 of the present embodiment. The display unit 14 of the present embodiment is divided into five regions in both the horizontal direction (A to E) and the vertical direction (1 to 5), and is divided into 25 regions. Herein, each region is referred to using alphabets (A to E) in the horizontal direction and numbers (1 to 5) in the vertical direction. For example, the upper left region is referred to as "region A1," a region positioned below a region A1 is referred to as "region A2," and a region positioned to the right of region A1 is referred to as "region B1." Note that it is preferable that these regions be not visually recognizable when viewed from the listener.

In each of the regions A1 to E5, the actuators 19*a* to 19*y* that vibrate the display surfaces are provided. Each of the actuators 19*a* to 19*y* is configured to vibrate the regions A1 to E5 in which the actuators are provided. For example, the boundary is divided using a damping material or the like so as to suppress vibration against an adjacent region. Note that, in the present embodiment, an arrangement form in which each of the regions A1 to E5 is adjacent to each other as a rectangular shape having the same area is adopted, but the arrangement form may have a shape other than the rectangular shape such as a circular shape, and a form in which the respective regions are separated from each other. Moreover, in each of the regions A1 to E5, independent unit display units may be arranged side by side. Furthermore, the areas of the respective regions may be different.

Figure 3:
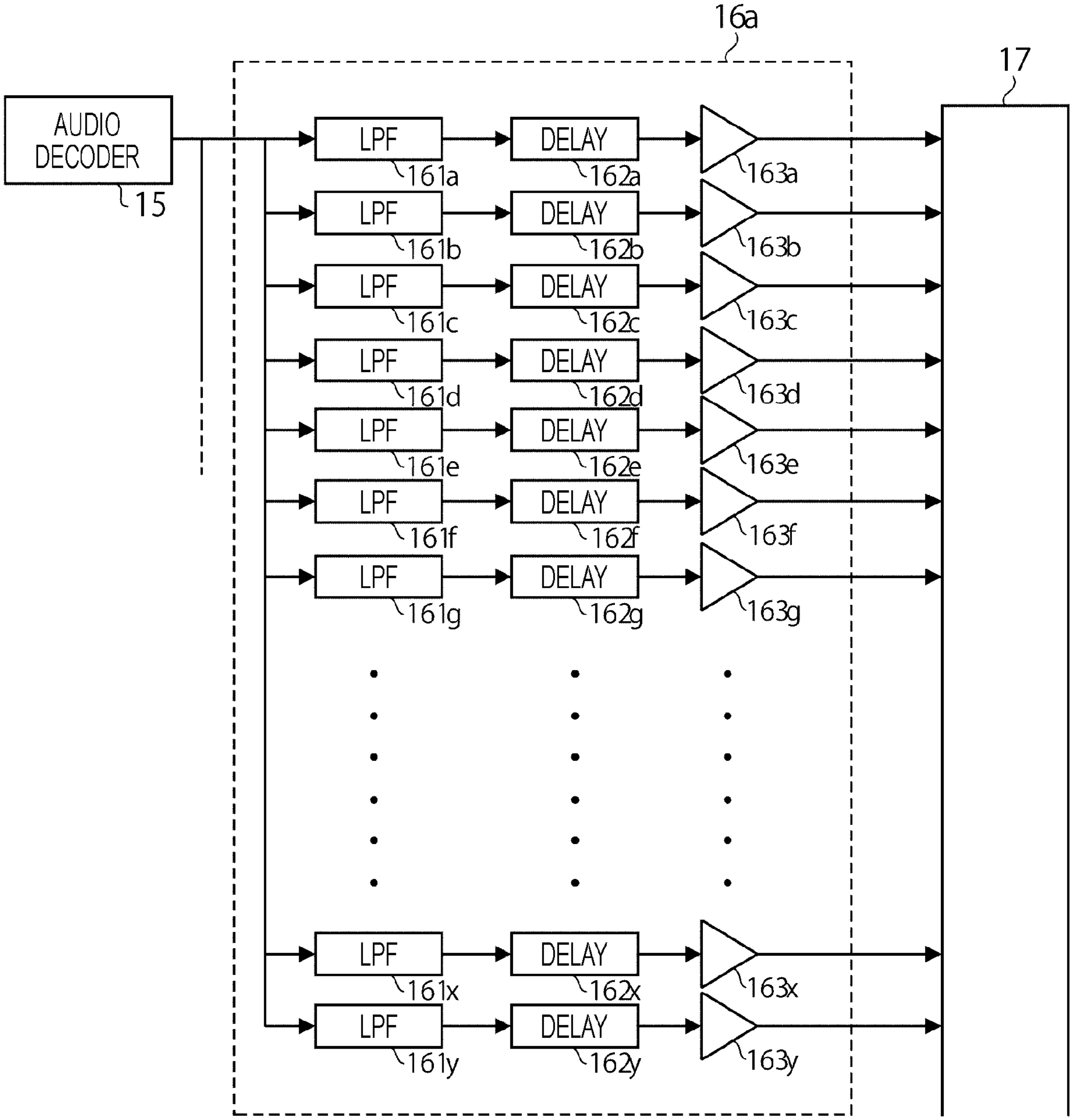
FIG. 3 is a block diagram illustrating the configuration of a signal processing unit according to an embodiment.

FIG. 3 is a block diagram illustrating the configuration of the signal processing unit 16*a* of the present embodiment. The other signal processing units 16*b* to 16*g* also have the similar configuration as the signal processing unit 16*a*. The decoded acoustic signal of the first channel is input into the signal processing unit 16*a*. In the signal processing unit 16*a*, input acoustic signals are passed through low pass filters (LPFs) 161*a* to 161*y*, delays 162*a* to 162*y*, and gain multipliers 163*a* to 163*y* provided for the actuators 19*a* to 19*y*, and an acoustic signal for each of actuators 19*a* to 19*y* is formed and output to the matrix control unit 17.

Meanwhile, in the image display device, a reflection (e.g., the viewer himself/herself or the background of the room) reflected by the display surface sometimes occurs in a low luminance (close to black) portion. In the image display device in the form of vibrating the screen of the display unit 14 and conveying sound to the listener as described in the schematic diagram of FIG. 2, the screen shakes, and accordingly, the reflection also shakes. With respect to such a reflection, the applicant has been able to verify that the intermediate band and the wide band of the sound do not cause a viewing problem because of the small amplitude amount, and that the image shake is easily perceived by the viewer particularly in the low band of the sound.

It is conceivable that such image shake due to the low band of the sound is eliminated by suppressing the low band output, but in that case, it is not possible to secure the sound quality originally desired to be output. Therefore, one object of the present embodiment is to suppress sensing of image shake as well as to provide an acoustic signal with high sound quality.

Figure 4A:
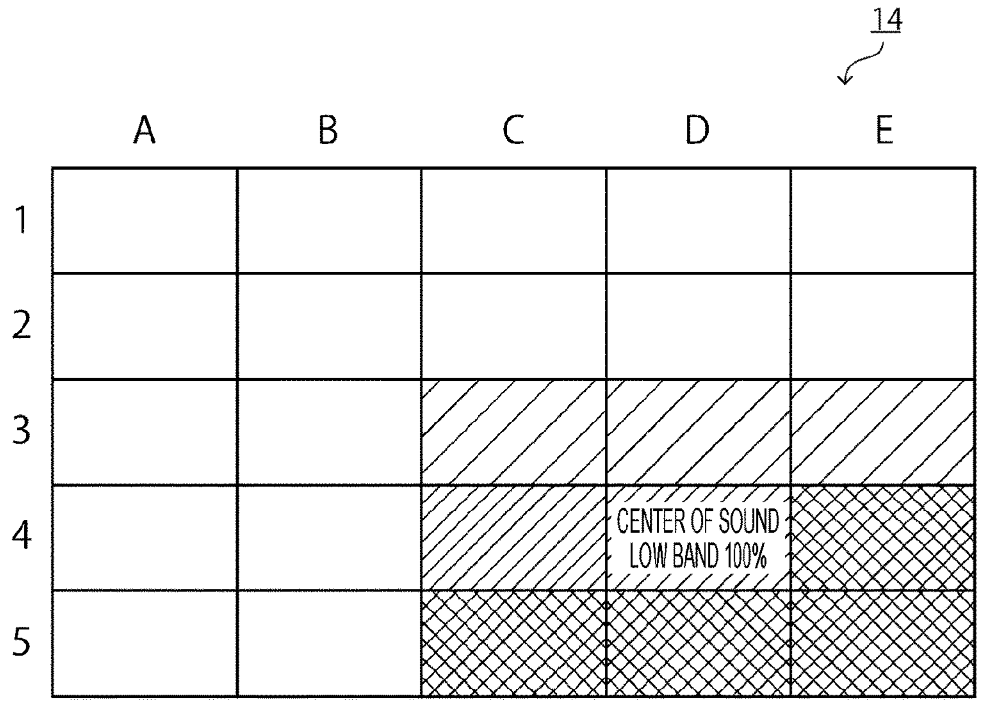
FIGS. 4A and 4B are diagrams for explaining one example of low band component reduction processing.
Figure 4B:
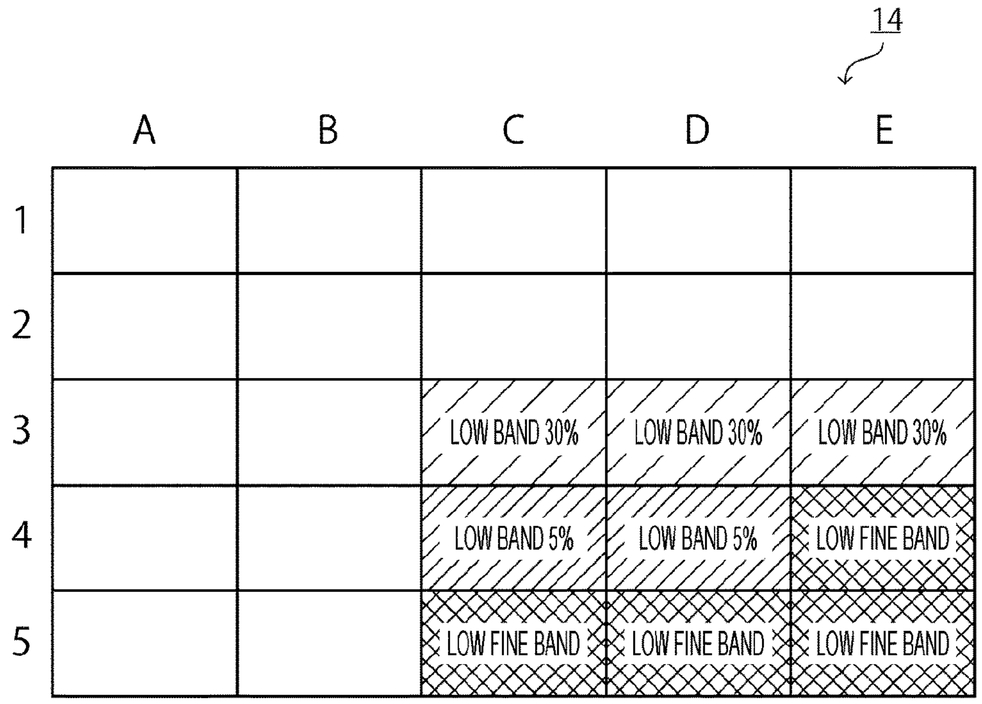

Therefore, the image display device 100 of the present embodiment performs, for example, low band component reduction processing in the image display device 100 explained with reference to FIG. 1. FIGS. 4A and 4B are diagrams for explaining the low band component reduction processing. FIG. 4A is a schematic diagram in a case where the low band component reduction processing is not performed for the display unit 14. In the image display device 100 of FIG. 1, the control unit 20 executes the low band component reduction processing. The control unit 20 calculates an average value of luminance for each of regions A1 to E5 on the basis of the image signal from the image processing unit 13. Then, a region in which the calculated luminance of each of the regions A1 to E5 is less than the threshold is detected as a region in which image shake possibly occurs. Furthermore, the control unit 20 calculates frequency characteristics of each of the regions A1 to E5 on the basis of the acoustic signal to be output in the each of regions A1 to E5 input from the matrix control unit 17. Then, the control unit 20 detects a region in which the average value of the luminance of each of the regions A1 to E5 is less than the threshold, and the low band component of the acoustic signal is equal to or greater than a predetermined value as a region in which the image shake possibly occurs.

In the example of FIG. 4A, a region D4 is a region where sound is to be output and where image shake possibly occurs. Furthermore, regions C3 to C5, D3, D5, and E3 to E5 are regions where image shake possibly occurs. Herein, in FIGS. 4A (A) and 4B (B), oblique lines drawn in the regions C3 to C5, D3 to D5, and E3 to E5 represent the average value of the luminance at the density of the oblique lines. Specifically, the higher the density of oblique lines, the lower the luminance. Then, in the low band component reduction processing executed by the control unit 20, the low band component of the acoustic signal to be output in the region D4 where image shake possibly occurs is output from another region.

FIG. 4B illustrates a state where the low band component reduction processing is executed. In the present embodiment, the low band component of the acoustic signal to be output from the region D4 is distributed to the regions C3 to C5, D3, D5, and E3 to E5 adjacent to the region D4. Moreover, on the basis of the luminance of each region, more low band components are distributed as the luminance is higher. That is, in the state of FIG. 4A, in a case where the low band component of the sound to be output from the region D4 is 100%, 30% of the low band component is distributed to the regions C3, D3, and E3 where the luminance is high to some extent, 5% of the low band component is distributed to the regions C4 and D4 where the luminance is medium, and the low fine band component is distributed to the regions C5, D5, E4, and E5 where the luminance is low.

The distribution of low band components executed in the low band component reduction processing can be executed by the matrix control unit 17. As described above, in the present embodiment, it is possible to suppress the image shake in the region where the image shake possible occurs by detecting the region where the image shake possibly occurs on the basis of the luminance displayed in each of the regions A1 to E5 and outputting the low band component of the acoustic signal to be output in the region where the image shake possibly occurs using the actuators 19*a* to 19*y* in another regions.

Meanwhile, in the low band component reduction processing explained with reference to FIGS. 4A and 4B, the low band component in the region D4 where the image shake possibly occurs is distributed to the own region D4 and adjacent regions C3 to C5, D3, D5, and E3 to E5. That is, the low band component output from the region D4 in FIG. 4A is substantially equal to the sum of the distributed regions C3 to C5, D3 to D5, and E3 to E5 in FIG. 4B. On the other hand, depending on the method of the low band component distribution processing, it is conceivable that the low band component is insufficient in the sum of the adjacent regions.

Figure 5A:
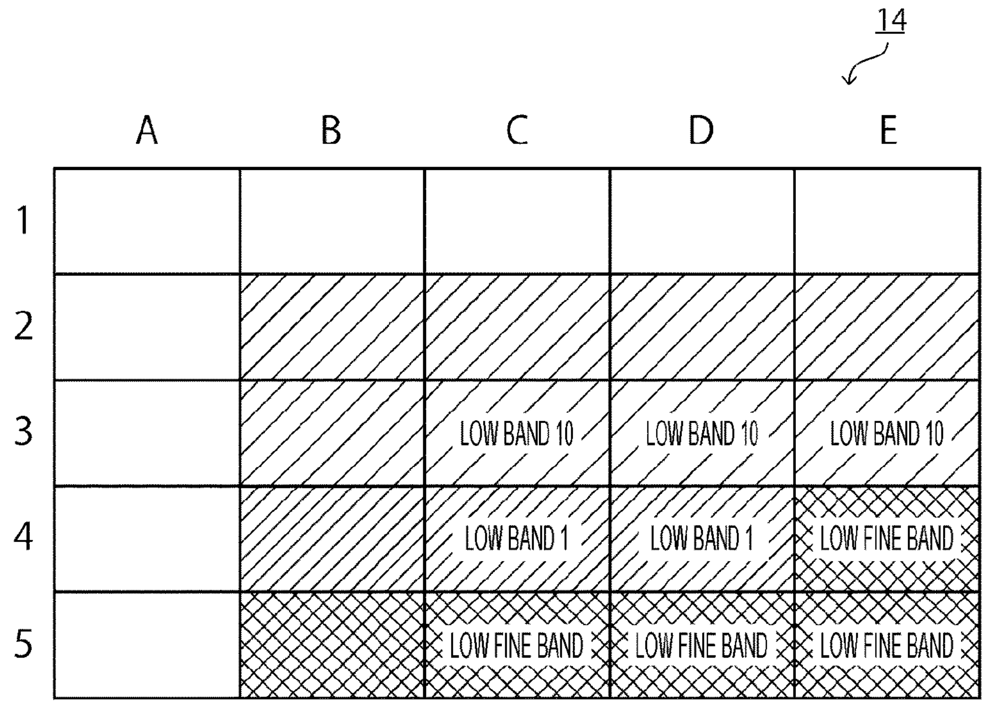
FIGS. 5A and 5B are diagrams for explaining another example of low band component reduction processing.
Figure 5B:
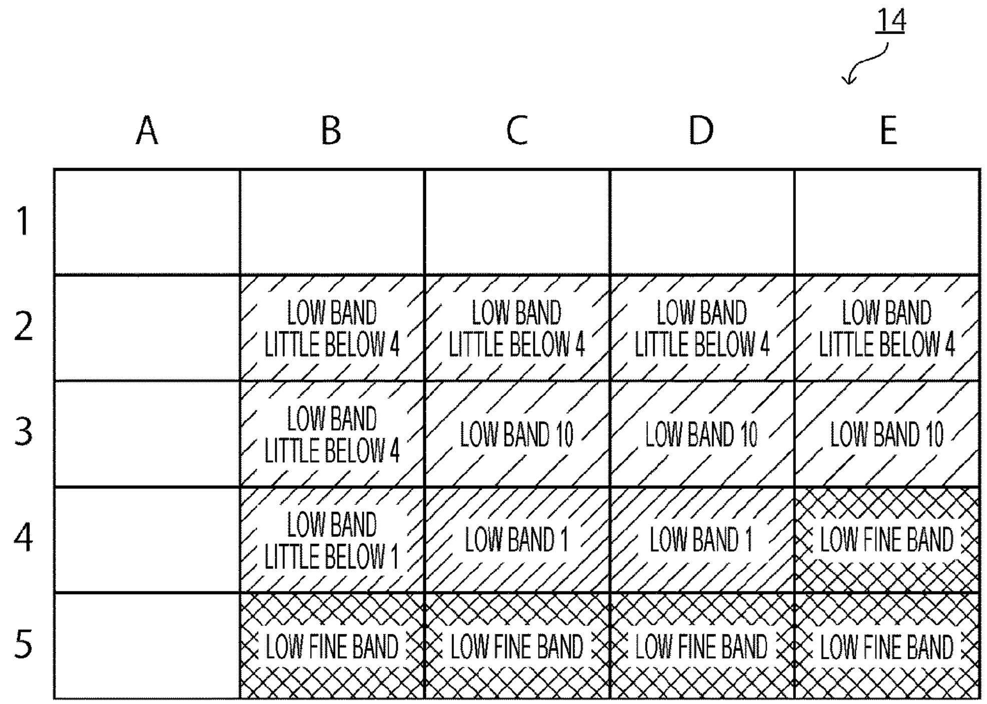

FIGS. 5A and 5B are diagrams illustrating the low band component reduction processing according to another example. In FIGS. 5A and 5B, as in the case of FIGS. 4A and 4B, a region D4 is a region where sound is to be output and a region where image shake possibly occurs. Furthermore, regions C3 to C5, D3, D5, and E3 to E5 are regions where image shake possibly occurs. Moreover, the density of oblique lines in the region represents the luminance average of the region. FIG. 5A illustrates a case where only a region adjacent to the region D4 is used as in FIGS. 4A and 4B. Herein, the numerical value described in the region indicates the absolute value of the low band component. It can be seen that the sum of the absolute values of the low band components output in FIG. 5A is about 32. Herein, it is assumed that the sum of the low band components to be originally output in the region D4 is 50. In this case, in FIG. 5A, the sum of the low band components is insufficient by about 18. In such a case, it is possible to cause an insufficient low band component to be output by further using the surrounding regions.

FIG. 5(B) is an improvement example of the low band component reduction processing of FIG. 5(A), and there is no change in the absolute values of the low band components output in the regions C3 to C5, D3 to D5, and E3 to E5. On the other hand, in the case of FIG. 5(A), the insufficient absolute value 18 of the low band component is compensated by further outputting from the surrounding regions B2 to B5, C2, D2, and E2. Also in this low band component reduction processing, the amount of the low band component is decided in accordance with the luminance of the region. Therefore, in the low band component reduction processing in this example, the amount of the low band component is reduced as the distance from the region D4 where the image shake possibly occurs increases, and the amount of the low band component is reduced as the luminance of the region decreases.

As described above, in the low band component reduction processing of another example illustrated in FIG. 5, in a case where the low band component to be output is insufficient, processing of compensating for the insufficient low band component by enlarging the region (increasing the number of regions) is included. Furthermore, as the distance from the region D4 where the image shake possibly occurs increases, the amount of the low band component decreases. In other words, as the distance decreases, the amount of the low band component increases. Therefore, original sound image localization (before the low band component reduction processing) can be maintained.

Figure 6:
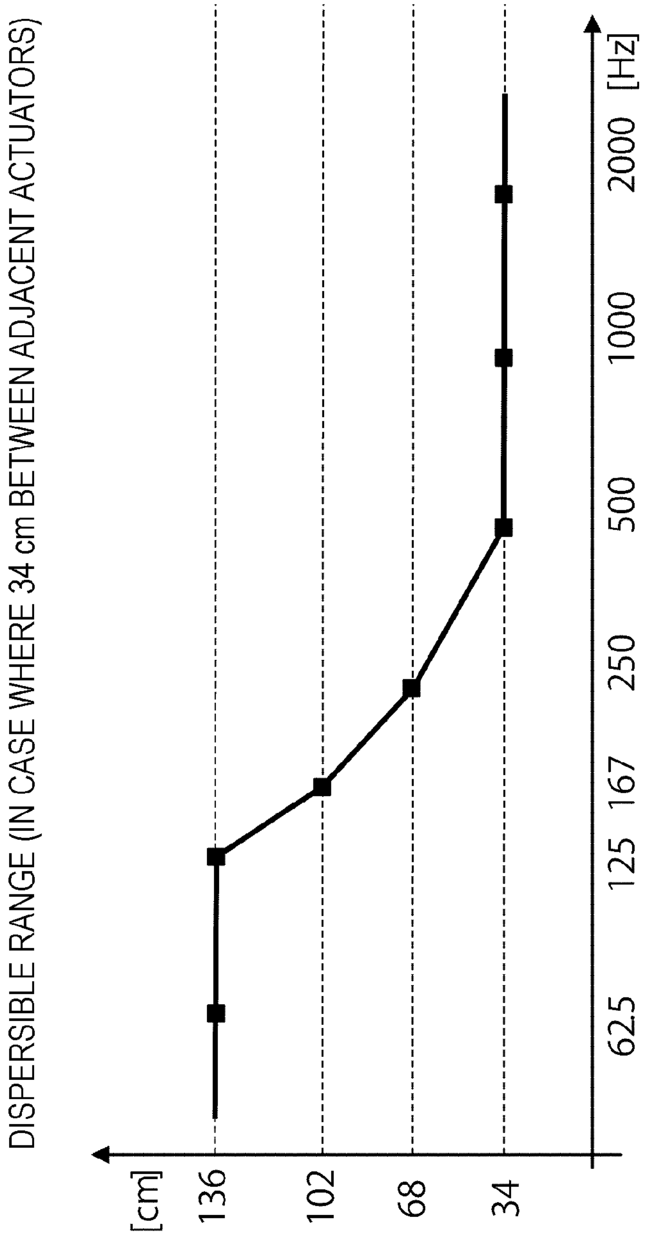
FIG. 6 is a graph for explaining one example of a dispersible range.

By the way, in general, it is known that the higher the frequency, the higher the directivity characteristic of sound. For example, the range of the region to be distributed may be changed depending on the frequency characteristic of the acoustic signal to be output in the region where image shake possibly occurs. FIG. 6 is a graph defining a distance (vertical axis) that can be dispersed with respect to the frequency characteristic (horizontal axis) of the sound, that is, a distance at which the user hardly feels uncomfortable even in a case where the sound is output from a distant position. In the case of FIG. 6, the distance between adjacent actuators is 34 cm. In the case of this example, for a frequency of about 500 Hz, it means that it is possible to distribute low band components up to 34 cm, that is, up to adjacent regions, and for example, if the frequency is less than or equal to 125 Hz or less, it is possible to distribute low band components up to 136 cm. In the low band component reduction processing, in consideration of such characteristics, the range of the region to be used (e.g., whether only adjacent regions are used as in FIG. 4A or expanded regions are used as in FIG. 5B may be changed depending on the frequency characteristics of the acoustic signal to be output in the region where the image shake is possibly occurs or the actual distance between the actuators.

Figure 7A:
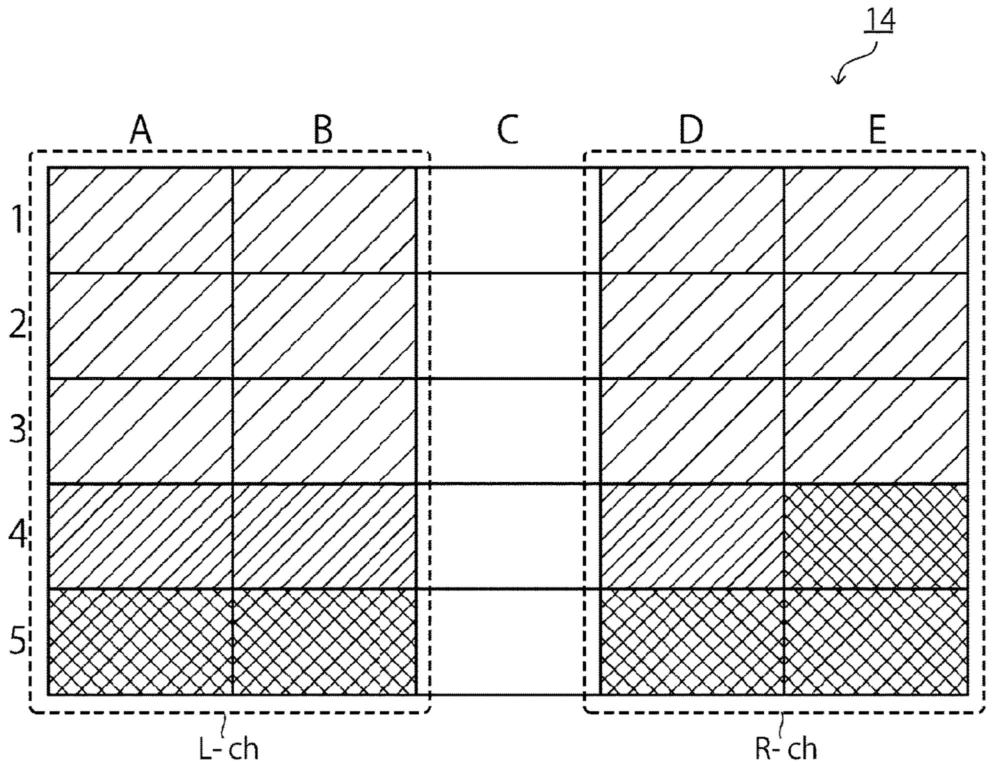
FIGS. 7A and 7B are diagrams for explaining another example of low band component reduction processing.
Figure 7B:
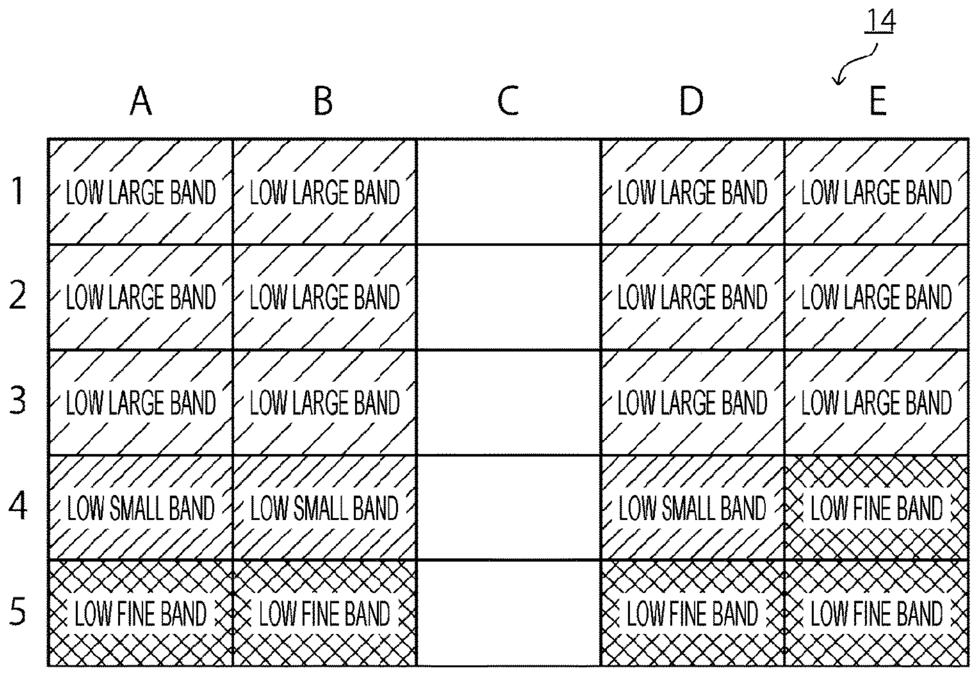

FIGS. 7A and 7B are diagrams for explaining the low band component reduction processing of another example. In the example of FIG. 7A, the acoustic signal of the left channel (L-ch) is output using the regions A1 to A5 and B1 to B5, and the acoustic signal of the right channel (R-ch) is output using the regions D1 to D5 and E1 to E5. Note that it is also possible to output the acoustic signal of the center channel from the regions C1 to C5. Moreover, oblique lines shown in each region indicate luminance in the region as in FIGS. 4A, 4B, 5A, and 5B. Specifically, the higher the density of oblique lines, the lower the luminance.

In such a case, before the low band component reduction processing is executed, the acoustic signals of the same left channel are evenly distributed and output from the actuators 19*a* to 19*j* in charge of the regions A1 to B5, and the acoustic signals of the same right channel are evenly distributed and output from the actuators 19*p* to 19*y* in charge of the regions D1 to E5. In that case, it is conceivable that image shake possibly occurs in a region with low luminance. The present example is different from the examples explained with reference to FIGS. 4 and 5 in that a region where image shake possibly occurs is not identified, while the region is identified.

FIG. 7B is a schematic diagram in a case where the low band component reduction processing is executed. In the low band component reduction processing of the present example, whether the low band component is equal to or greater than a predetermined value is monitored for each channel, and in a case where the luminance in the region is less than the predetermined value, it is detected that image shake possibly occurs. In a case where image shake possibly occurs, a low band component is distributed in accordance with the luminance of the region. Also in this case, a large number of low band components are output from a region with high luminance, and a small number of low band components are output from a region with low luminance. By executing the low band component reduction processing in the plurality of predetermined regions in this manner, it is possible to suppress the image shake without greatly disturbing the localization of the sound. Note that, in the present example, the case of the 2-ch stereo signal has been explained, but similar low band component reduction processing can also be executed for the number of channels of 3-ch including the center channel or more channels.

Furthermore, in the present example, for each of the regions A1 to B5 of the left channel and the regions D1 to E5 of the right channel, the possibility of occurrence of image shake is detected on the basis of the frequency characteristic of the acoustic signal and the luminance of each region, and in a case where there is a possibility of image shake, the low band component reduction processing is executed. It is not limited to such a form, and for example, the low band component reduction processing may be always executed without detecting the possibility of occurrence of image shake. Since the processing related to the detection of the possibility of occurrence of image shake is not necessary, the load of the entire processing can be reduced.

FIG. 8 is a table for explaining luminance, volume, and a low band high pass filter (HPF) of each region. Note that, in FIG. 8, the level of luminance at which the image shake cannot be recognized regardless of the amplitude amount is set to 100, and the luminance is indicated by a relative value with respect to the numerical value (100). The characteristics of the acoustic signal output in each region may be performed on the basis of the table described in FIG. 8. The control unit 20 can store the table indicating the characteristics of FIG. 8 and decide the characteristics of the acoustic signal output in each region in the low band component reduction processing on the basis of the table. In this table, the lower the value indicating the luminance in the region, the lower the volume of the low band component as well as the higher the cutoff frequency of the HPF. Note that, in this table, both the volume and the cutoff frequency (frequency characteristics) of the HPF are controlled, but it is needless to say that the effect is exerted even in a case where either one is controlled.

Figure 9:
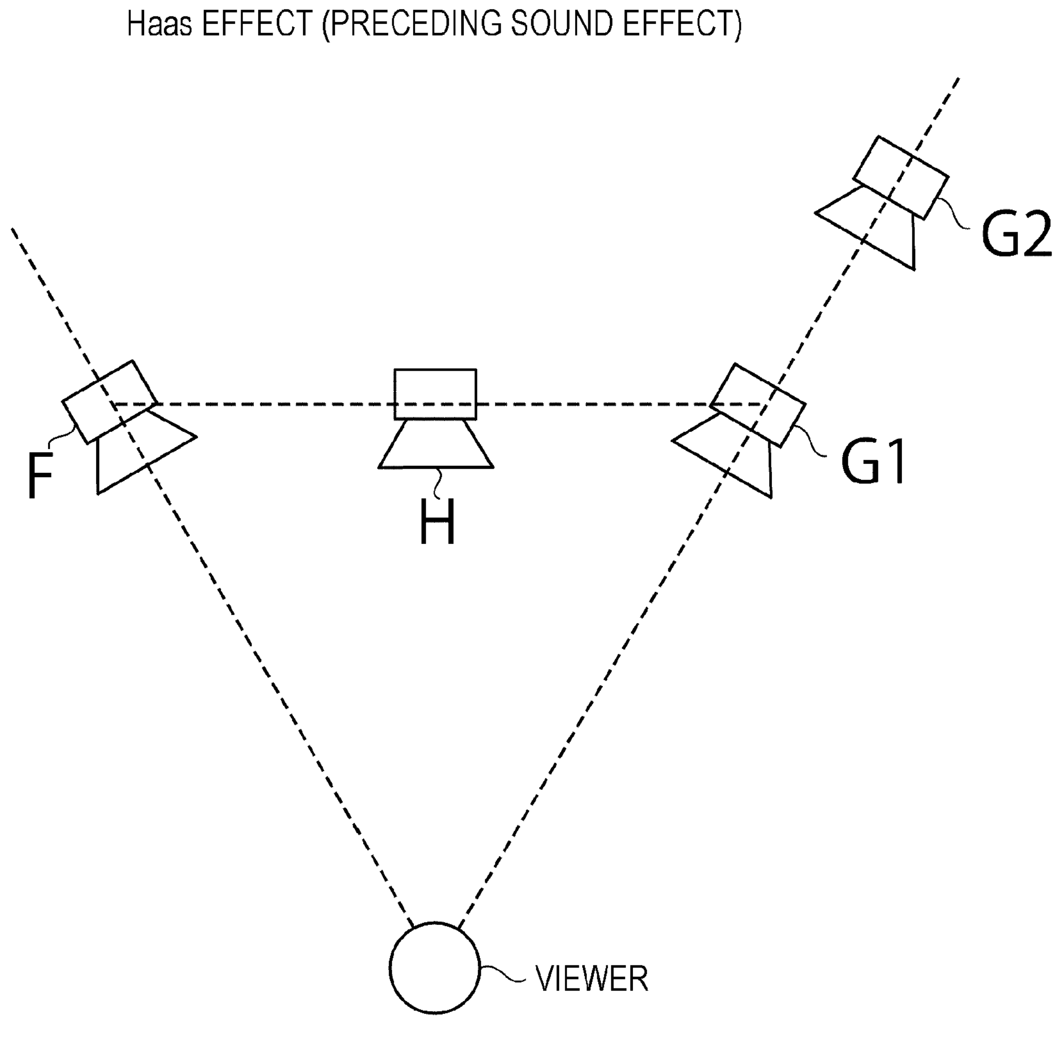
FIG. 9 is a diagram for explaining the Haas effect (preceding sound effect).

FIG. 9 is a diagram for explaining the Haas effect (preceding sound effect). The Haas effect is an effect related to sound image localization on perception. As illustrated in FIG. 9, in a case where a sound source is provided in front of the viewer, at a position F, and at a position G1, the sound image is located at an intermediate position H. Herein, in a case where the sound image is delayed to the sound source positioned at the position G1 (equivalent to a case where the sound image is moved backward to the position G2), it is known that the sound image moves to the right position F.

In the low band component reduction processing, since the sound is output from a position different from the region where the image shake possibly occurs, there is a possibility that the sound image is different from the originally intended sound image. In such a case, by using the Haas effect described above and delaying the low band components to be output, it is possible to cause the viewer to perceive as being output from the region to be originally output.

Figure 10:
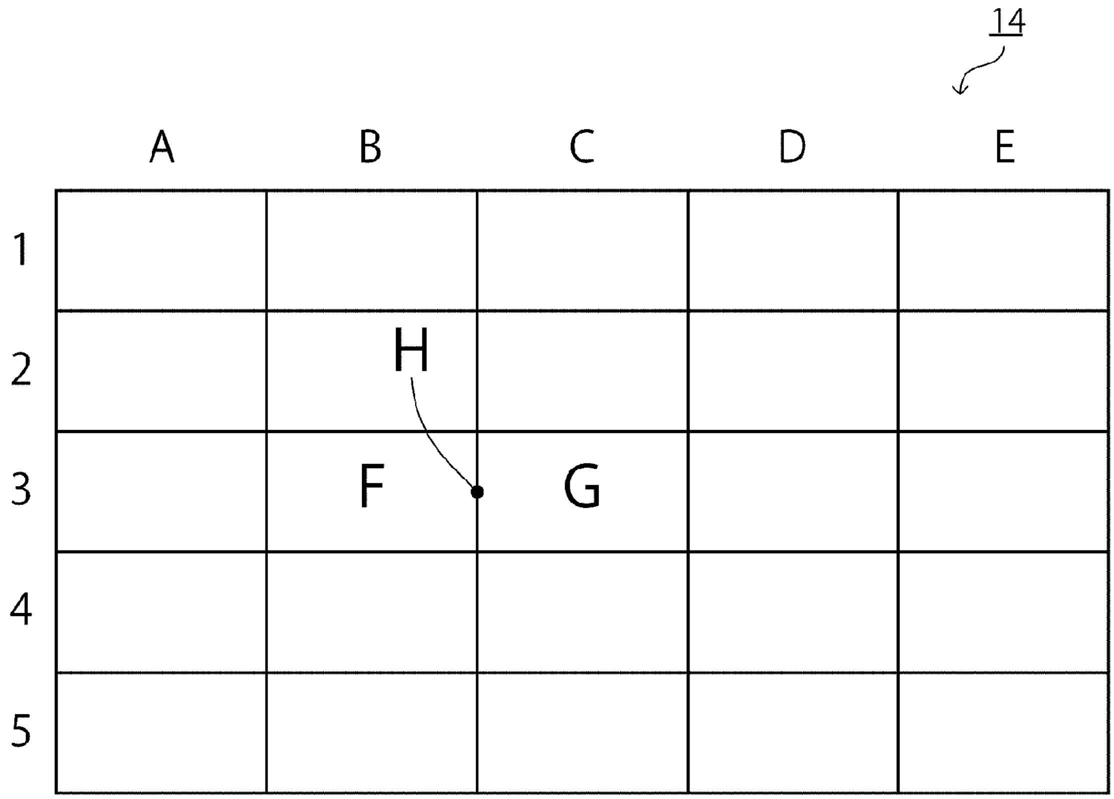
FIG. 10 is a diagram for explaining one example of low band component reduction processing in a case where the Haas effect (preceding sound effect) is used.

FIG. 10 is a diagram for explaining low band component reduction processing in a case where the Haas effect (preceding sound effect) is used. Positions F, H, and G illustrated in FIG. 10 correspond to the positions F, H, and G in FIG. 9. In a case where the low band component is output from the two positions F and G by the low band component reduction processing although the low band component should be originally output at the position F, the sound image is localized at the position H. Herein, in a case where it is originally desired to localize the sound image to the position F, it is possible to localize the sound image to the original position F by delaying the low band component of the position G. As described above, by providing a delay to the low band component, it is possible to change the localization by the Haas effect, and even in a case where the low band component is output from a region other than the region where the image shake occurs, it is possible to listen as if the low band component is generated from the region where the image shake occurs.

Figure 11A:
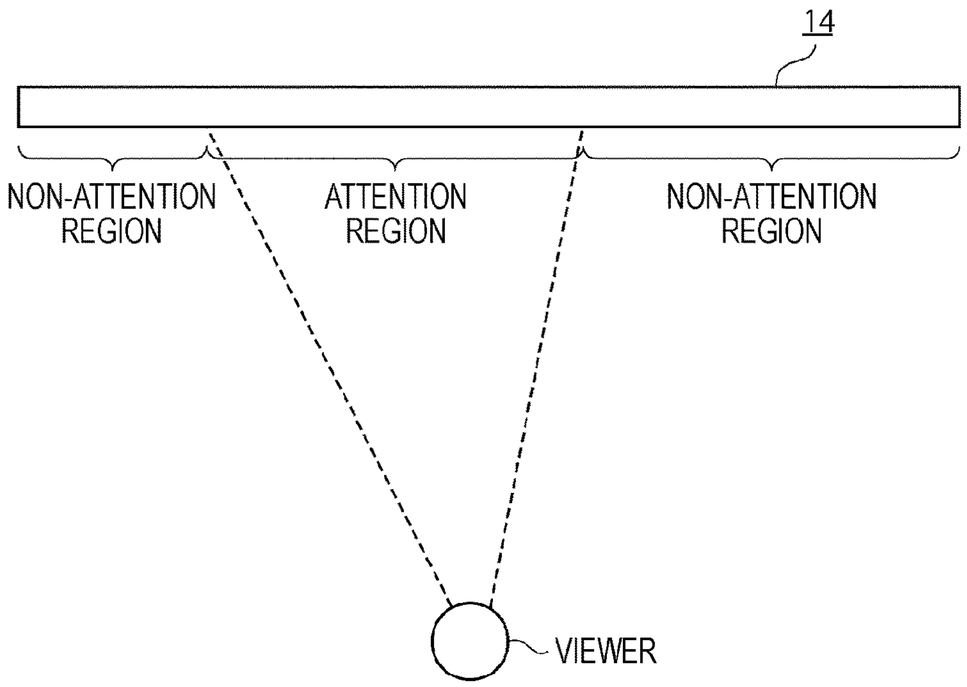
FIGS. 11A and 11B are diagrams for explaining one example of low band component reduction processing in consideration of an attention region.
Figure 11B:
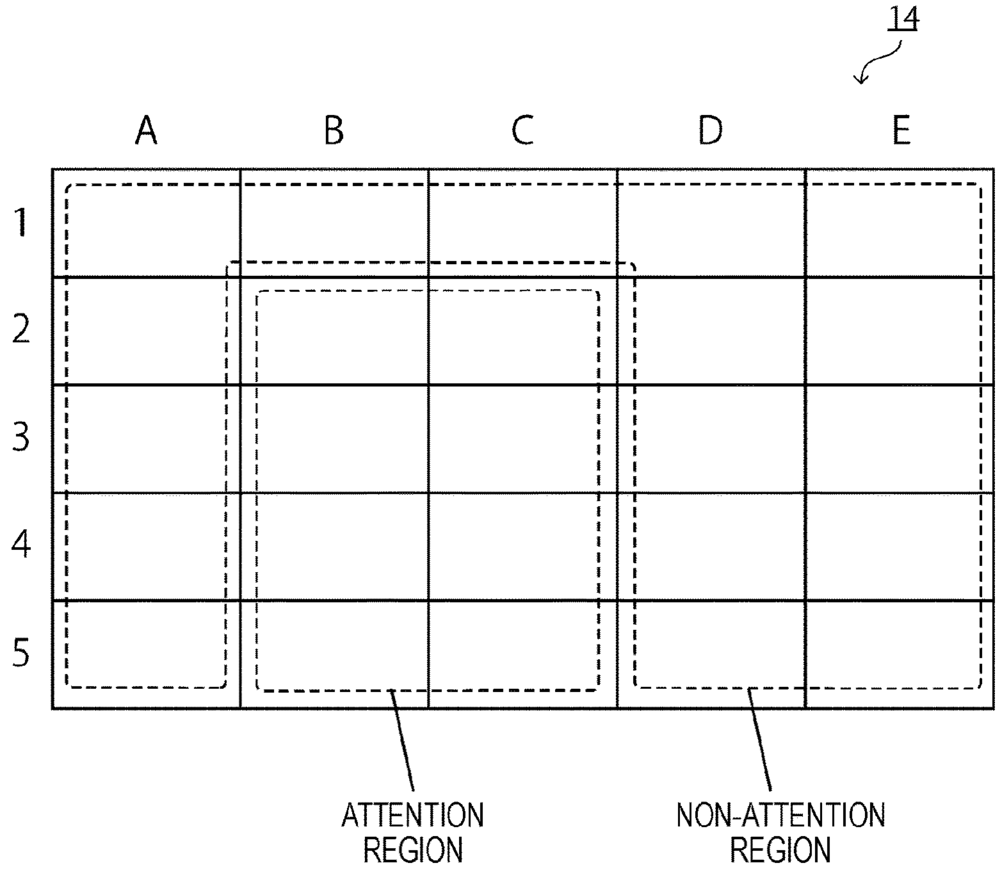

FIGS. 11A and 11B are views relating to another example, and is a view for explaining the low band component reduction processing in consideration of attention regions. FIG. 11A is a diagram illustrating a positional relationship between the display unit 14 and the viewer, and FIG. 11B is a schematic diagram when the display unit 14 is viewed from the front. In this example, the image display device 100 can input a signal from a camera capable of capturing at least one of the position or the line-of-sight of the viewer. The image display device 100 determines which region of the display unit the viewer is giving attention on the basis of the information from the camera. Then, the control unit 20 that executes the low band component reduction processing in the image display device 100 sets only the attention region as a processing target of the low band component reduction processing.

That is, even in a case where a region having a possibility of image shake is detected in the non-attention region, the low band component reduction processing is not executed. In a case where a region having a possibility of image shake is detected in the attention region, the low band component reduction processing is executed. In such a form, it is possible to suppress the viewer from perceiving the image shake and to cut the processing load of the low band component reduction processing. Note that the attention region of the viewer may be determined not only on the basis of information from the camera but also using various sensors.

Figure 12A:
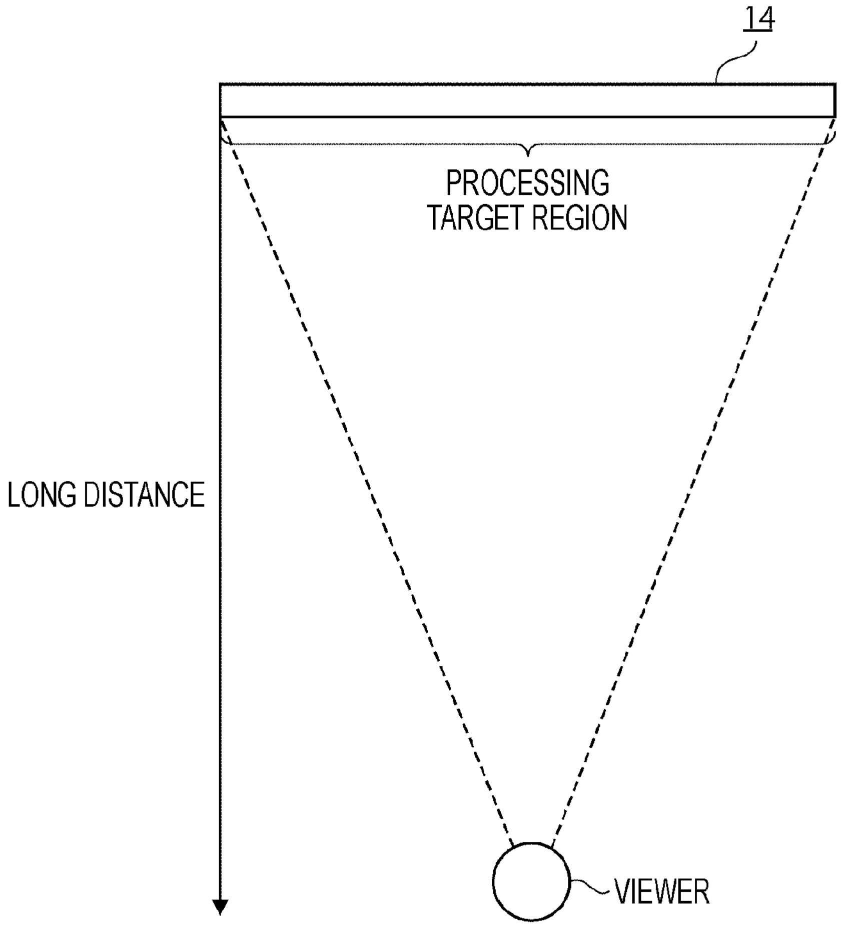
FIGS. 12A and 12B are diagrams for explaining one example of low band component reduction processing in consideration of the distance to the viewer.
Figure 12B:
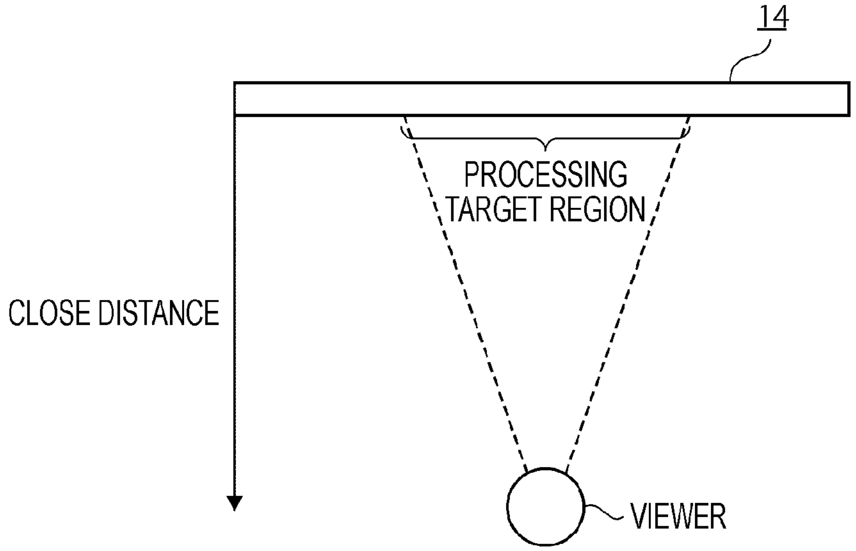

FIGS. 12A and 12B are diagrams relating to another example, and is a diagram for explaining the low band component reduction processing in consideration of the distance to the viewer. Also in this example, the distance from the display unit 14 to the viewer is measured using a camera or various sensors. The control unit 20 decides a processing target region of the low band component reduction processing on the basis of the measured distance to the viewer. Specifically, the longer the distance from the display unit 14 to the viewer, the larger the processing target region is enlarged. On the other hand, the shorter the distance from the display unit 14 to the viewer, the smaller the processing target region. Also in such an example, similar to the previous example, it is possible to suppress the viewer from perceiving the image shake and to cut the processing load of the low band component reduction processing.

Figure 13A:
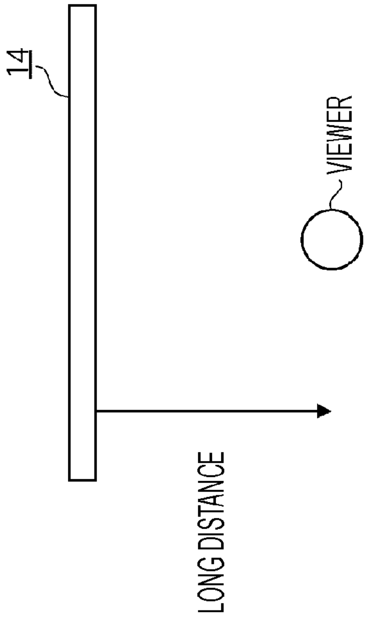
FIGS. 13A, 13B, 13C and 13D are diagrams for explaining one example of low band component reduction processing in consideration of the distance to the viewer.
Figure 13B:
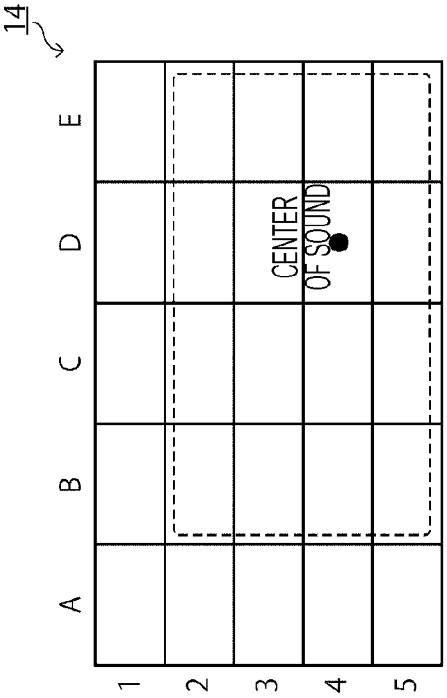
Figure 13C:
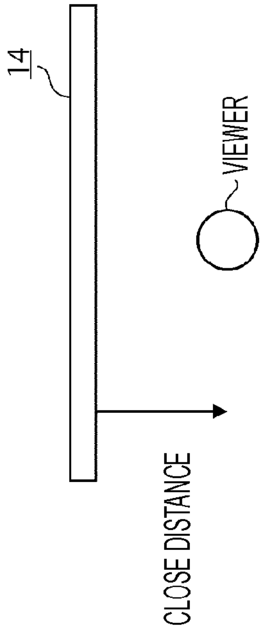
Figure 13D:
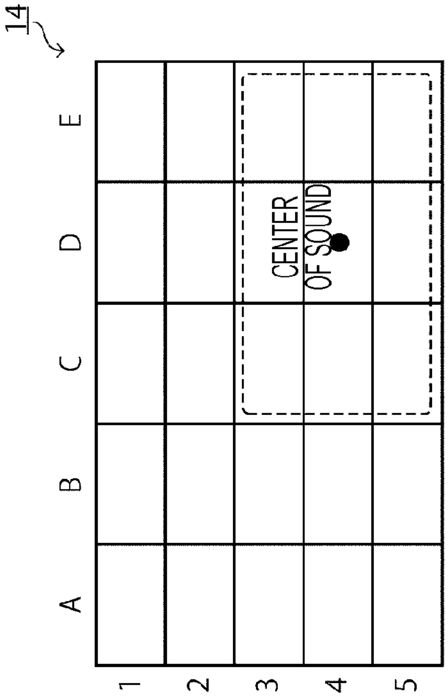

FIGS. 13A, 13B, 13C, and 13D are diagrams relating to still another example, and is a diagram for explaining the low band component reduction processing in consideration of the distance to the viewer. In the example explained with reference to FIGS. 12A and 12B, the distance to the viewer is used, but in the examples of FIGS. 13A, 13B, 13C, and 13D, the center position (center of sound) of the output sound is considered. FIGS. 13A and 13C are diagrams illustrating the distance relationship from the display unit 14 to the viewer. FIGS. 13B and 13D are diagrams illustrating processing target regions corresponding to a case where the distance is long and a case where the distance is short, respectively.

Also in this example, the distance from the display unit 14 to the viewer is measured using a camera or various sensors. The control unit 20 decides a processing target region of the low band component reduction processing on the basis of the measured distance to the viewer and the center of sound. Specifically, the longer the distance from the display unit 14 to the viewer, the larger the processing target region is enlarged with reference to the position of the center of sound. On the other hand, in a case where the distance from the display unit 14 to the viewer is short, the processing target region is reduced with reference to the position of the center of sound. Also in such an example, similar to the previous example, it is possible to suppress the viewer from perceiving the image shake and to cut the processing load of the low band component reduction processing.

Modification Example

The low band component reduction processing has been explained above with the image display device of the present embodiments as an example. In the above-described embodiment, in order to compensate for the reduced low band components, the reduced low band components are compensated from other regions provided in the display unit 14. In such a form, the reduced low band component is localized in the screen of the display unit. On the other hand, it is known that the low band component has low directivity, and it may be difficult for the viewer of the image to identify the sound source position of the low band component. By utilizing such characteristics, the reduced low band components may be output from speakers other than the actuators 19*a* to 19*y* provided in the display unit 14.

The present disclosure can also be realized by an apparatus, a method, a system, and the like. Moreover, the matters described in each embodiment and modification examples can be appropriately combined.

The present disclosure can also adopt the following configurations.

(1)

A signal processing device including:

a control unit configured to control each of a plurality of actuators configured to drive a display unit on the basis of an acoustic signal, in which the plurality of the actuators is provided for respective regions of the display unit, and the control unit executes low band component reduction processing of reducing a low band component of the acoustic signal of the region for driving the actuator on the basis of luminance of an image to be displayed in the region of the display unit.

(2)

The signal processing device according to (1), in which the low band component reduction processing includes processing of outputting a reduced low band component from the actuator provided in the other region different from the region.

(3)

The signal processing device according to (2), in which the low band component reduction processing includes processing of outputting the reduced low band component from the actuator provided in the other region adjacent to the region.

(4)

The signal processing device according to (2), in which the low band component reduction processing includes processing of changing a volume or a frequency characteristic of a low band component to be output from the other region on the basis of luminance of an image to be displayed in the other region.

(5)

The signal processing device according to any one of (1) to (4), in which the low band component reduction processing includes processing of deciding a region in which a low band component of an acoustic signal is reduced on a basis of luminance of an image to be displayed in the region of the display unit and a frequency characteristic of the acoustic signal corresponding to the region.

(6)

The signal processing device according to any one of (1) to (5), in which the low band component reduction processing is executed for each of a plurality of predetermined regions.

(7)

The signal processing device according to any one of (1) to (5), in which the low band component reduction processing includes processing of changing an application region on the basis of a positional relationship between the display unit and a viewer detected by a sensor.

(8)

The signal processing device according to any one of (1) to (8), in which the low band component reduction processing includes processing of outputting a reduced low band component from a speaker.

(9)

A signal processing method including:

controlling, by a control unit, each of a plurality of actuators configured to drive a display unit on the basis of an acoustic signal, in which the plurality of the actuators is provided for respective regions of the display unit, and the control unit executes low band component reduction processing of reducing a low band component of an acoustic signal of the region for driving the actuator on the basis of luminance of an image to be displayed in the region of the display unit.

(10)

A program causing a computer to execute a signal processing method including:

controlling, by a control unit, each of a plurality of actuators configured to drive a display unit on the basis of an acoustic signal, in which the plurality of the actuators is provided for respective regions of the display unit, and the control unit executes low band component reduction processing of reducing a low band component of the acoustic signal of the region for driving the actuator on the basis of luminance of an image to be displayed in the region of the display unit.

(11)

An image display device including:

a display unit configured to display an image;

a plurality of actuators configured to drive the display unit on the basis of an acoustic signal; and a control unit configured to control each of the plurality of actuators, in which the plurality of the actuators is provided for respective regions of the display unit, and the control unit executes low band component reduction processing of reducing a low band component of an acoustic signal of the region for driving the actuator on the basis of luminance of an image to be displayed in the region of the display unit.

REFERENCE SIGNS LIST

11 Tuner
12 Video decoder
13 Image processing unit
14 Display unit
15 Audio decoder
16*a* to 16*g* Signal processing unit
17 Matrix control unit
18*a* to 18*y* Amplifier
19*a* to 19*y* Actuator
161*a* to 161*y* LPF
162*a* to 162*y* Delay
163*a* to 163*y* Gain multiplier

The invention claimed is:

1. A signal processing device, comprising:

a control unit configured to:

control each of a plurality of actuators, wherein each actuator of the plurality of actuators is configured to drive a display unit based on an acoustic signal, and each actuator of the plurality of actuators corresponds to a respective region of a plurality of regions of the display unit;

select a first region of the plurality of the regions based on a luminance of an image displayed in the display unit and a frequency characteristic of the acoustic signal corresponding to the first region; and execute low band component reduction processing to reduce a low band component of the acoustic signal of the first region of the plurality of regions to drive an actuator of the plurality of actuators, wherein the execution is based on the luminance of the image displayed in the first region of the display unit.

2. The signal processing device according to claim 1, wherein the control unit is further configured to output the reduced low band component from the actuator in a second region different from the first region.

3. The signal processing device according to claim 1, wherein the control unit is further configured to output the reduced low band component from the actuator in a second region adjacent to the first region.

4. The signal processing device according to claim 2, wherein the control unit is further configured to:

change a volume or the frequency characteristic of the reduced low band component output from the second region, wherein the change is based on the luminance of the image to be displayed in the second region; and output the reduced low band component from the actuator in the second region different from the first region.

5. The signal processing device according to claim 1, wherein the control unit is further configured to execute the low band component reduction processing for each of the regions.

6. The signal processing device according to claim 1, wherein the control unit is further configured to select the first region based on a positional relationship between the display unit and a viewer detected by a sensor.

7. The signal processing device according to claim 1, wherein the control unit is further configured to output the reduced low band component from a speaker.

8. A signal processing method, comprising:

in a signal processing device:

controlling, each of a plurality of actuators, wherein each actuator of the plurality of actuators is configured to drive a display unit based on an acoustic signal, and each actuator of the plurality of actuators corresponds to a respective region of a plurality of regions of the display unit;

selecting a first region of the plurality of the regions based on a luminance of an image displayed in the display unit and a frequency characteristic of the acoustic signal corresponding to the first region; and executing low band component reduction processing to reduce a low band component of the acoustic signal of the first region of the plurality of regions to drive an actuator of the plurality of actuators, wherein the execution is based on the luminance of the image displayed in the first region of the display unit.

9. A non-transitory computer-readable medium having stored thereon, computer-executable instructions which, when executed by a signal processing device, cause the signal processing device to execute operations, the operations comprising:

controlling, each of a plurality of actuators, wherein each actuator of the plurality of actuators is configured to drive a display unit based on an acoustic signal, and each actuator of the plurality of actuators corresponds to a respective region of a plurality of regions of the display unit;

selecting a first region of the plurality of the regions based on a luminance of an image displayed in the display unit and a frequency characteristic of the acoustic signal corresponding to the first region; and executing low band component reduction processing to reduce a low band component of the acoustic signal of the first region of the plurality of regions to drive an actuator of the plurality of actuators, wherein the execution is based on the luminance of the image displayed in the first region of the display unit.

10. An image display device, comprising:

a display unit configured to display an image;

a plurality of actuators configured to drive the display unit based on an acoustic signal; and a control unit configured to:

control each actuator of the plurality of the actuators, wherein each actuator of the plurality of actuators corresponds to a respective region of a plurality of regions of the display unit;

select a first region of the plurality of the regions based on a positional relationship between the display unit and a viewer detected by a sensor related to the image display device; and execute low band component reduction processing to reduce a low band component of the acoustic signal of the first region of the plurality of regions to drive an for driving the actuator of the plurality of actuators, wherein the execution is based on a luminance of the image displayed in the first region of the display unit.

* * * * *